United States Patent
Cannings

(10) Patent No.: US 11,048,749 B2
(45) Date of Patent: Jun. 29, 2021

(54) SECURE SEARCHABLE MEDIA OBJECT

(71) Applicants: INTELLIGENT VOICE LIMITED, London (GB); Nigel Henry Cannings, London (GB)

(72) Inventor: Nigel Henry Cannings, London (GB)

(*) Notice: Subject to any disclaimer, the term of this patent is extended or adjusted under 35 U.S.C. 154(b) by 232 days.

(21) Appl. No.: 16/091,468

(22) PCT Filed: Apr. 5, 2017

(86) PCT No.: PCT/GB2017/050955
§ 371 (c)(1),
(2) Date: Oct. 4, 2018

(87) PCT Pub. No.: WO2017/174985
PCT Pub. Date: Oct. 12, 2017

(65) Prior Publication Data
US 2019/0155843 A1 May 23, 2019

(30) Foreign Application Priority Data
Apr. 5, 2016 (GB) .................................. 1605811

(51) Int. Cl.
*G06F 16/00* (2019.01)
*G10L 15/00* (2013.01)
(Continued)

(52) U.S. Cl.
CPC .......... *G06F 16/685* (2019.01); *G06F 16/313* (2019.01); *G06F 16/433* (2019.01);
(Continued)

(58) Field of Classification Search
CPC .. G06F 16/685; G06F 16/7867; G06F 16/116; G06F 16/986; G06F 16/70;
(Continued)

(56) References Cited

U.S. PATENT DOCUMENTS 5,649,060 A * 7/1997 Ellozy ................. G11B 27/028
704/278
6,173,259 B1 * 1/2001 Bijl .......................... G06F 3/16
704/235
(Continued)

FOREIGN PATENT DOCUMENTS

EP  1 688 913 A1 * 8/2006
WO  WO2004/049308 A1 * 6/2004
(Continued)

OTHER PUBLICATIONS

Ken-ichi Iso et al., "Web-based topic language modeling for audio indexing", IEEE International Conference on Multimedia and Expo, Jul. 2009, pp. 826-829.*
(Continued)

*Primary Examiner* — Srirama Channavajjala

(57) ABSTRACT

A searchable media object comprises means for playing a media file; an audio file processor operable to receive a standard audio file and convert the standard audio file into machine coding; an Automatic Speech Recognition processor, operable to receive the standard audio file, determine each spoken word and output a string of text comprising each of the determined words, wherein each word in the string is accorded a time indicative of the time of occurrence of the word in the string; an assembler, operable to receive the machine coding, the string of text and the relevant topics and therefrom, assemble the self contained searchable media object comprising a media player operable without connection to the internet; and, a search engine operable to receive a user word search enquiry, search the string of text for the word search enquiry, determine the accorded time of the occurrence of each word enquiry in the string of text, display the occurrences of the determined word search enquiry to a user, receive a user instruction indicative of a user selected word and retrieve the relevant portion of the audio file in (Continued)

Figure 1:
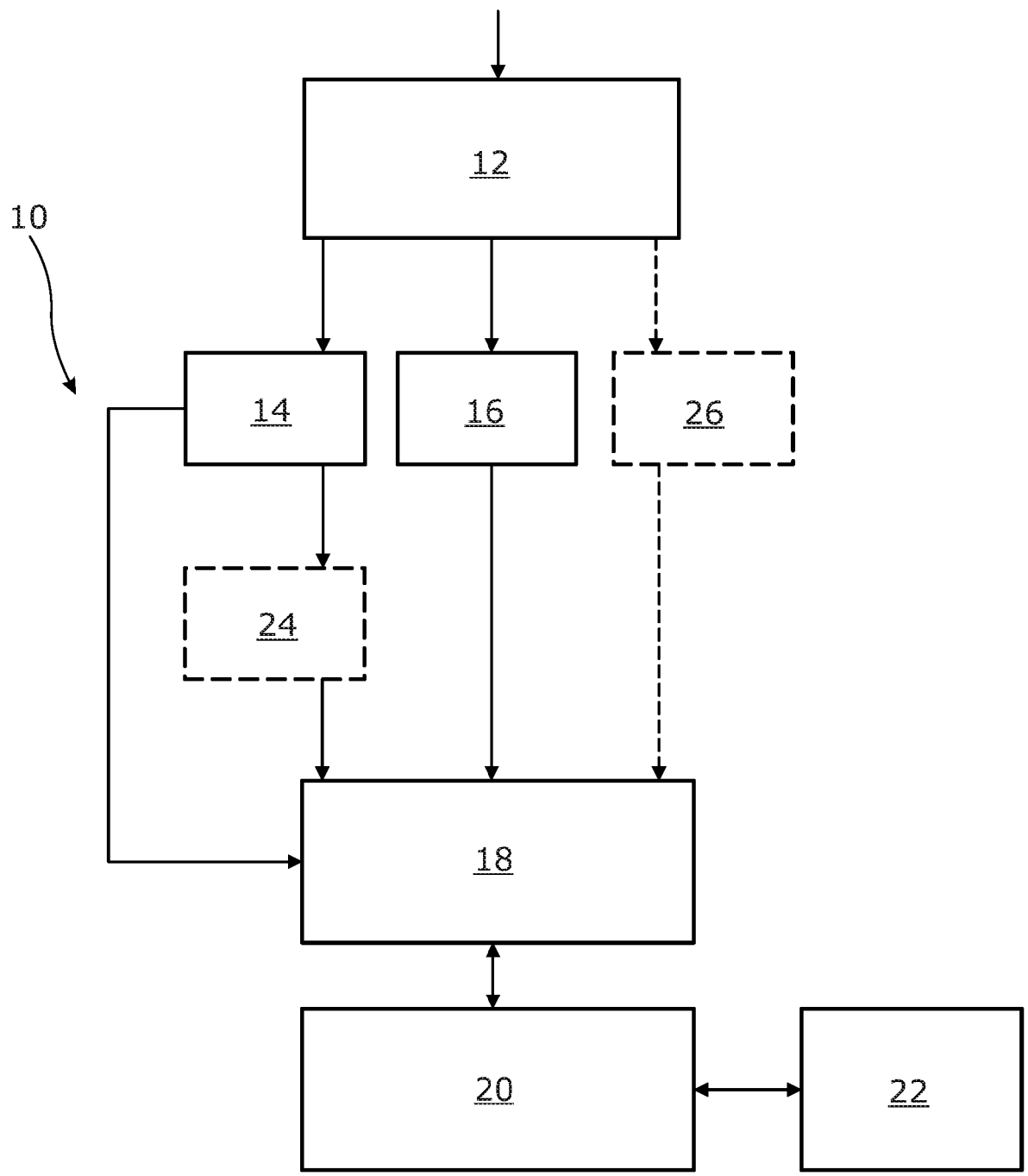

which the selected word search enquiry occurs and playback the retrieved relevant portion to the user.

16 Claims, 2 Drawing Sheets

(51) Int. Cl.
| | |
|---|---|
| *G06F 16/683* | (2019.01) |
| *G06F 16/61* | (2019.01) |
| *G10L 15/08* | (2006.01) |
| *G10L 15/18* | (2013.01) |
| *G06F 16/638* | (2019.01) |
| *G06F 16/953* | (2019.01) |
| *G06F 16/432* | (2019.01) |
| *G06F 16/31* | (2019.01) |
| *G10L 15/22* | (2006.01) |
| *G10L 15/26* | (2006.01) |

(52) U.S. Cl.
CPC ............ *G06F 16/61* (2019.01); *G06F 16/638* (2019.01); *G06F 16/953* (2019.01); *G10L 15/08* (2013.01); *G10L 15/1815* (2013.01); *G10L 15/22* (2013.01); *G10L 15/26* (2013.01)

(58) Field of Classification Search
CPC ...... G06F 16/248; G06F 16/14; G06F 16/148; G06F 16/2455; G06F 16/3344; G06F 16/433; G06F 16/489; G06F 16/438; G06F 16/4387; G06F 16/44; G06F 16/5846; G06F 16/313; G06F 16/61; G06F 16/3343; G06F 16/58; G06F 16/953; G06F 16/638; G06F 16/7844; H04L 67/02; H04L 67/06; H04L 67/2823; G10L 13/00; G10L 15/20; G10L 15/22; G10L 15/26; G10L 19/00; G10L 15/08; G10L 15/1815; H04M 3/42221
See application file for complete search history.

(56) References Cited

U.S. PATENT DOCUMENTS

| | | | | |
|---|---|---|---|---|
| 7,027,987 B1* | 4/2006 | Franz | ........................ | G10L 15/22 704/236 |
| 7,272,558 B1* | 9/2007 | Soucy | ................... | G10L 15/063 704/235 |
| 7,912,699 B1* | 3/2011 | Saraclar | ................ | G10L 15/142 704/9 |
| 8,914,286 B1* | 12/2014 | Seeker-Walker | ..... | G10L 15/063 704/244 |
| 10,546,064 B2* | 1/2020 | Cannings | ................ | G06F 40/30 |
| 2002/0099542 A1* | 7/2002 | Mitchell | ................ | G06F 40/58 704/231 |
| 2004/0210443 A1* | 10/2004 | Kuhn | ...................... | G10L 15/22 704/276 |
| 2005/0108234 A1* | 5/2005 | Oksanen | ............... | G06F 3/0485 |
| 2007/0044010 A1* | 2/2007 | Sull | ..................... | G06F 16/7867 715/202 |
| 2007/0156410 A1* | 7/2007 | Stohr | ...................... | G06F 16/64 704/275 |
| 2007/0156843 A1* | 7/2007 | Sagen | ...................... | G10L 15/26 709/217 |
| 2008/0270110 A1* | 10/2008 | Yurick | .................. | G06F 16/685 704/3 |
| 2009/0043581 A1* | 2/2009 | Abbott | .................. | G10L 15/187 704/254 |
| 2009/0063279 A1* | 3/2009 | Ives | ........................ | G06Q 30/00 705/14.73 |
| 2009/0150159 A1* | 6/2009 | Ahlin | .................... | G06F 16/634 704/275 |
| 2009/0287650 A1* | 11/2009 | Cha | .......................... | G10L 15/26 |
| 2010/0076996 A1* | 3/2010 | Hu | .......................... | G10L 25/00 707/771 |
| 2011/0060751 A1* | 3/2011 | English | ................. | G06F 16/438 707/758 |
| 2012/0117078 A1* | 5/2012 | Morton | ................. | G06F 16/447 707/741 |
| 2012/0203776 A1* | 8/2012 | Nissan | ................. | G06F 16/685 707/728 |
| 2014/0100681 A1* | 4/2014 | Jeong | ...................... | G06F 3/162 700/94 |
| 2014/0372123 A1* | 12/2014 | Go | .......................... | G10L 13/08 704/260 |
| 2016/0078860 A1* | 3/2016 | Paulik | .................. | G10L 15/197 704/244 |

FOREIGN PATENT DOCUMENTS

| | | |
|---|---|---|
| WO | 2004 097791 A2 | 11/2004 |
| WO | WO2007027410 A2 * | 3/2007 |
| WO | WO 2017/174985 * | 10/2017 |

OTHER PUBLICATIONS

Ece Çakir et al., "An Evaluation of Major Image Search Engines on Various Query Topics" The Third International Conference on Internet Monitoring and Protection Jun.-Jul. 2008, pp. 161-165.*

EP 17 717 829.0, Examination Report dated Feb. 17, 2021 (6 pages).

* cited by examiner

SECURE SEARCHABLE MEDIA OBJECT

BACKGROUND

The present invention relates to searchable media objects and players and particularly to discrete searchable media objects which are able to preserve the privacy of the media data.

A normal audio or video file is in effect a serial access medium whereby in order to access certain audio (including speech) contained within it, it is necessary to listen to or to watch the file at its original speed (or very close to it) until that data is found. Thus, for someone tasked with listening to an audio file or watching a video file to search for certain words, phrases or topics (e.g. a paralegal in a discovery process), such a task is time consuming and fatiguing. In contrast, for example, a paper transcript can be relatively quickly speed-read by a human at rates in excess of 700 words per minute, i.e. in a fraction of the time and the effort.

A human transcription of audio, whilst generally accurate, is time consuming, often taking 6 to 8 hours to transcribe one audio hour. Furthermore, whilst machine transcription of audio does exist, it is not perfect and even if it were, it is often difficult to make full sense of a machine transcription if the audio is not played at the same time to give context to the transcription.

It is known for lengthy machine or human transcripts to be provided with time stamps interspersed therein. For example, indicating when a conversation, part of a conversation or a paragraph begins and its duration.

It is also known from European Patent Application EP0649144A1 to analyse audio in order to align a written transcript with speech in video and audio clips; in effect, providing an index for random access to corresponding words and phrases in the video and audio clips.

Automated Speech Recognition (ASR) receives an audio information signal representative of spoken word and outputs a transcript of the recognised speech. However, the transcripts are grammatically unstructured and therefore it is not possible to gain any contextual understanding or derive other potentially important information of the spoken word from the transcript.

Moreover, determining and monitoring the context of the spoken word in, for example, telephone conversations is particularly problematic for automated systems because telephone conversations are more chopped and broken compared to the spoken word in, for example, presentations, dictations and face to face conversations. Also, when monitoring telephone conversations for unlawful or adverse practices, parties of the telephone conversation may use coded words or covert behaviour.

A system and method for contextualising a stream of unstructured text representative of spoken word is described in patent document number WO2015118324A1.

Many different types of media players exist for playing audio and audio-visual files. The known media players generally operate as a computer and/or web-based application, stored on a server at one location, which downloads and plays a media file (e.g. WAV, mp3 and mp4) which is stored on a remote server at a different location. Examples of such media players include the YouTube® and Adobe® Flash® platforms.

These web-based platforms are adequate for most requirements of media playing. However, in certain circumstances, it is undesirable to store sensitive, secret and/or confidential media files on a remote server and have to download them over a network, particularly the internet, in order to play the media. For example, public and private organizations such as legal, military, governmental and financial organisations often have sensitive, secret and/or confidential audio and audio-visual files which need to be reviewed. Storing and playing such media files on a server and playing the files on a media player over a network, particularly over a public network, is undesirable because of the risk of the network, and therefore the media files, being hacked and therefore the sensitive, secret and/or confidential content of the media files becoming available to unauthorised third party individuals and/or organisations.

It is therefore desirable in the industry for there to be means which enables a user to play and review audio and audio-visual files in a secure environment.

It is also desirable in the industry for such audio and audio-visual files to be searchable for key words, phrases and topics.

An object of the invention is therefore to provide a secure searchable means for playing media files which can be used to review sensitive, secret and/or confidential audio and/or audio-visual content.

SUMMARY OF INVENTION

According to a first aspect of the present invention, there is provided a searchable media object comprising: an audio file processor operable to receive a standard audio file and convert the standard audio file into machine coding; an Automatic Speech Recognition processor, operable to receive the standard audio file, determine each spoken word and output a string of text comprising each of the determined words, wherein each word in the string is accorded a time relevant to the time of the occurrence of the word in the string; an assembler, operable to receive the machine coding, the string of text and the relevant topics and therefrom, assemble a self-contained searchable media object which is operable without connection to the internet; and a search engine operable to receive a user word search enquiry, search the string of text for the word search enquiry, determine the accorded time of the occurrence of each word enquiry in the string of text, display the occurrences of the determined word search enquiry to a user, receive a user instruction indicative of a user selected word and retrieve the relevant portion of the audio file in which the selected word search enquiry occurs and playback the retrieved relevant portion to the user.

The searchable media object advantageously further comprises a topic extraction processor, operable to receive the string of text from the Automatic Speech Recognition processor and determine relevant topics in the string of text and record the time of occurrence of each determined topic within the string of text. The search engine is advantageously operable to receive a user topic search enquiry, search the string of text for the topic search enquiry, determine the accorded time of the occurrence of each topic enquiry in the string of text, display the occurrences of the determined topic search enquiry to a user, receive a user instruction indicative of a user selected topic and retrieve the relevant portion of the audio file in which the selected topic search enquiry occurs and playback the retrieved relevant portion to the user.

The standard audio file may be an audio-visual file.

The standard audio file may comprise at least one of a WAV, MP3 and MP4 file.

The searchable media object may further comprise an audio speaker operable to receive the standard audio file and output an audio signal to the assembler.

The assembler is advantageously a HTML5 assembler.

Each word in the string of text is advantageously accorded a time at the beginning of the occurrence of the word and accorded a time at the end of the occurrence of the word.

Each topic in the string of text is advantageously accorded a time at the beginning of the occurrence of the topic and accorded a time at the end of the occurrence of the topic.

The searchable media object and the audio file is advantageously contained in a discrete portable digital file.

The searchable media player is advantageously run using a web browser which is not connected to the internet.

According to a second aspect of the present invention, there is provided a method of searching an audio file, comprising: providing an audio file processor; activating the audio file processor to receive a standard audio file and convert the standard audio file into machine coding; providing an Automatic Speech Recognition processor; activating the Automatic Speech Recognition processor to receive the standard audio file, determining each spoken word in the audio file, outputting a string of text comprising each of the determined words; according a time of occurrence for each determined word in the string; providing an assembler; receiving the machine coding, the string of text and the relevant topics and therefrom, assembling a discrete mediaobject; providing a search engine; receiving a user word search enquiry; searching the string of text for the word search enquiry; determining the accorded time of the occurrence of each topic enquiry in the string of text; displaying the occurrences of the determined topic search enquiry to a user; receiving a user instruction indicative of a user selected topic; retrieving the relevant portion of the audio file in which the selected topic search enquiry occurs; and playing the retrieved relevant portion to the user.

The method advantageously further comprises providing a topic extraction processor, receiving the string of text from the Automatic Speech Recognition processor; determining relevant topics in the string of text; and recording the time of occurrence of each determined topic within the string of text.

The method advantageously further comprises receiving a user topic search enquiry; searching the string of text for the topic search enquiry; determining the accorded time of the occurrence of each topic enquiry in the string of text; displaying the occurrences of the determined topic search enquiry to a user; receiving a user instruction indicative of a user selected topic; retrieving the relevant portion of the audio file in which the selected topic search enquiry occurs; and playing the retrieved relevant portion to the user.

The standard audio file may be an audio-visual file.

The standard audio file may comprise at least one of a WAV, MP3 and MP4 file.

The method may further comprise providing an audio speaker, receiving the standard audio file and outputting an audio signal to the assembler.

The assembler is advantageously HTML5 assembler.

Each word in the string of text is advantageously accorded a time at the beginning of the occurrence of the word and accorded a time at the end of the occurrence of the word.

Each topic in the string of text is advantageously accorded a time at the beginning of the occurrence of the topic and accorded a time at the end of the occurrence of the topic.

The searchable media object and the audio file is advantageously contained in a discrete portable digital file.

The searchable media object is advantageously run using a web browser which is not connected to the internet.

According to a third aspect of the present invention, there is provided a computer-readable storage device having instructions stored which, when executed by a computing device, result in the computing device performing operations in accordance with a method according to claims.

DETAILED DESCRIPTION

Figure 2:
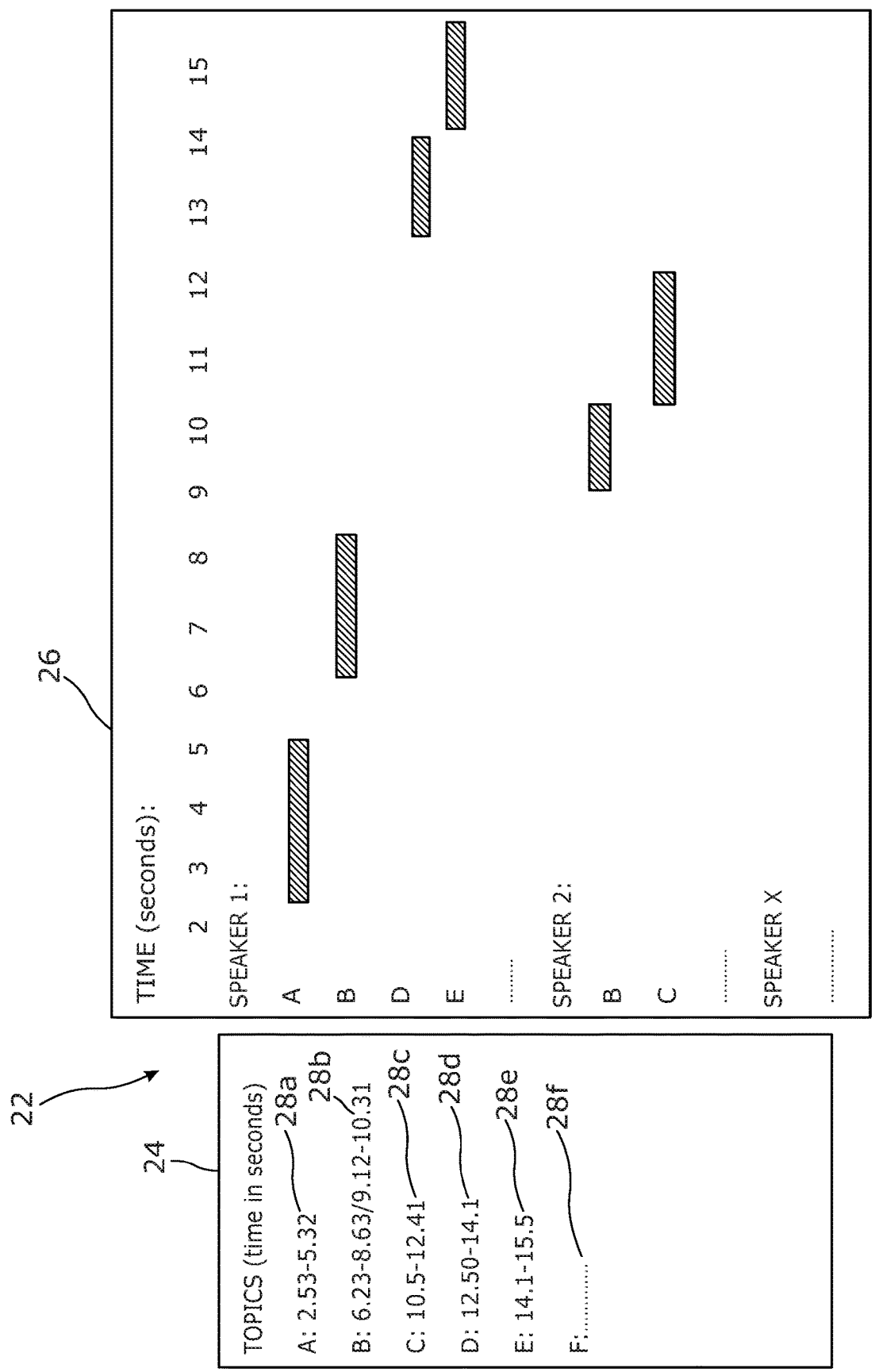

The present invention will now be illustrated, by way of example only, with reference to the accompanying drawing in which:

FIG. 1 is a schematic drawing of a searchable media player and method according to the present invention; and FIG. 2 is a schematic drawing of a user interface of the searchable media player of FIG. 1.

Referring to FIG. 1, a searchable media object 10, according to the present invention, comprises a media file input processor 12, an Automatic Speech Recognition (ASR) processor 14, a media file conversion processor 16, an assembler 18, a search engine 20 and a user interface 22.

The searchable media object 10 may optionally additionally comprise a topic extraction processor 24 and an audio speaker 26.

The media file input processor 12 receives a standard media file (i.e. an audio file or audio-visual file), such as a WAV, MP3 or MP4 file. The media file input processor 12 outputs the standard media file to the Automatic Speech Recognition processor 14 and to the media file conversion processor 16. The media file input processor 12 may additionally output the standard media file to the audio speaker 26, where the speaker is utilised.

The Automatic Speech Recognition processor 14 transcripts the standard media file into a stream of text whereby each word is determined within the stream of text. The beginning and end of each determined word is accorded a time of occurrence within the stream of text. The transcripted stream of text and accorded times of the words are output to the assembler 18.

The Automatic Speech Recognition processor 14 also advantageously outputs the transcripted stream of text to a topic extraction processor 24. The topic extraction processor 24 determines each relevant contextual topic within the stream of text.

The beginning and end of each determined topic is accorded a time of occurrence within the stream of text. A list of the determined topics and the associated accorded times of occurrence of the determined topics is outputted to the assembler 18.

A system and method for contextualising topics from a stream of unstructured text representative of spoken word is described in patent document number WO2015118324A1.

The media file conversion processor 16 converts the media file to machine code, such as, for example, Base64 code. The machine code is output to the assembler 18.

When utilised, the audio speaker 26 outputs an audio signal to the assembler 18.

The assembler assembles, using for example, HTML5 assembly language, the searchable media object 10 from the transcripted stream of text, the list of determined topics, the machine code and the audio signal. Therefore, a self-contained searchable media object is assembled which includes means for playing a media file, the transcripted stream of text, the list of determined topics, the machine code and the audio signal. This advantageously provides a discrete, secure and portable searchable media object, which can be run on any computing device without the need for connection to the internet, required by known media players.

The assembler 18 communicates with the search engine 20 to enable a user to search the media file for key words, phrases and/or topics through the user interface 22.

The searchable media object 10 is run using a web browser, such as, for example, Microsoft® Internet Explorer, but without being connected to the internet. Therefore, the searchable media object 10 is a discrete, self-contained searchable media object comprising a media player and the media file, and thereby providing a secure means for playing, searching and reviewing sensitive, confidential and/or secret audio and visual-audio files.

Referring also to FIG. 2, the user interface 22 comprises a word/topic user interface 24 and temporal interface 26.

The word/topic interface 24 comprises a list of words/topics (A, B, C, D, E, F . . . ) and a time of occurrence list 28a-f . . . , which is a list of times at which each word/topic occurs in the stream of text.

The temporal interface 26 comprises schematic representation of the words/topics (A, B, C, D, E, F . . . ) and at what times each word/topic occurs in the stream of text and which speaker spoke the word/topic. As can be seen, different speakers may be recorded as having spoken the same word/topic.

In use, a user enters a word/topic (A, B, C, D, E, F . . . ) in a search text box or selects a word/topic (A, B, C, D, E, F . . . ) from the list in the word/topic interface 24. The search engine 20 undertakes a search of the stream of text and the list of determined topics for the requested word/topic (A, B, C, D, E, F . . . ). Upon finding one or more occurrences of the requested word/topic (A, B, C, D, E, F . . . ), the search engine determines the accorded time of occurrences and displays the list 28a-f. The search engine then retrieves the one or more portions of the relevant audio recording in which the selected word/topics occur and displays the relevant one or more portions in the temporal interface 26 for the user to determine where in the audio recording the selected word/topic occurs. The media player 10 then replays the relevant portion of the audio recording containing the selected word/topic for the user to review. Therefore, the media player 10 enables a user to instantaneously locate a topic/word and review the relevant portion of the audio recording without having to undertake the time-consuming task of listening through the audio or audio-video from the beginning of the recording.

Other embodiments falling within the scope of the appended claims will suggest themselves to those skilled in the art.

The invention claimed is:

1. A searchable media object comprising:
an audio file processor operable to receive a standard audio file and convert the standard audio file into machine coding;
an Automatic Speech Recognition processor, operable to receive the standard audio file, determine each spoken word and output a string of text comprising each of the determined words, wherein each word in the string is accorded a time indicative of the time of occurrence of the word in the string;
an assembler, operable to receive the machine coding, the string of text and the relevant topics and therefrom, assemble the self-contained searchable media object which is operable without connection to the Internet;
a search engine operable to receive a user word search enquiry, search the string of text for the word search enquiry, determine the accorded time of the occurrence of each word enquiry in the string of text, display the occurrences of the determined word search enquiry to a user, receive a user instruction indicative of a user selected word and retrieve the relevant portion of the audio file in which the selected word search enquiry occurs and playback the retrieved relevant portion to the user; and
a topic extraction processor, operable to receive the string of text from the Automatic Speech Recognition processor and determine relevant topics in the string of text and record the time of occurrence of each determined topic within the string of text;
wherein the search engine is operable to receive a user topic search enquiry, search the string of text for the topic search enquiry, determine the accorded time of the occurrence of each topic enquiry in the string of text, display the occurrences of the determined topic search enquiry to a user, receive a user instruction indicative of a user selected topic and retrieve the relevant portion of the audio file in which the selected topic search enquiry occurs and playback the retrieved relevant portion to the user;
wherein the user interface comprises a word/topic user interface and a temporal interface; and
wherein the word/topic interface comprises a list of words/topics and a time of occurrence list which is a list of times at which each word/topic occurs in the string of text and the temporal interface comprises a schematic representation of the words/topics and at what times each word/topic occurs in the stream of text and which speaker of a plurality of speakers spoke the word/topic.

2. A searchable media object as claimed in claim 1, wherein the standard audio file is an audio-visual file.

3. A searchable media object as claimed in claim 1, wherein the standard audio file comprises at least one of a WAV, a MP3 and a MP4 file.

4. A searchable media object as claimed in claim 1, further comprising an audio speaker operable to receive the standard audio file and output an audio signal to the assembler.

5. A searchable media object as claimed in claim 1, wherein the assembler is a hypertext markup language assembler.

6. A searchable media object as claimed in claim 1, wherein each word in the string of text is accorded a time at the beginning of the occurrence of the word and accorded a time at the end of the occurrence of the word and/or wherein each topic in the string of text is accorded a time at the beginning of the occurrence of the topic and accorded a time at the end of the occurrence of the topic.

7. A searchable media object as claimed in claim 1, wherein the searchable media object and the audio file are contained in a discrete portable digital file.

8. A searchable media object as claimed in claim 1, wherein the searchable media object is run using a web browser which is not connected to the Internet.

9. A method of searching an audio file, comprising:
providing an audio file processor;
activating the audio file processor to receive a standard audio file and convert the standard audio file into machine coding;
providing an Automatic Speech Recognition processor;
activating the Automatic Speech Recognition processor to receive the standard audio file, determining each spoken word in the audio file,
outputting a string of text comprising each of the determined words;

according each determined word in the string, a time relevant to the time of the occurrence of the word in the string;

providing an assembler;

receiving the machine coding, the string of text and the relevant topics and therefrom, assembling a discrete media object;

providing a search engine;

providing a topic extraction processor;

receiving the string of text from the Automatic Speech Recognition processor;

determining relevant topics in the string of text and recording the time of occurrence of each determined topic within the string of text;

providing a user interface, wherein the user interface comprises a word/topic user interface and a temporal interface, wherein the word/topic interface comprises a list of words/topics and a time of occurrence list which is a list of times at which each word/topic occurs in the string of text, and wherein the temporal interface comprises a schematic representation of the words/topics and at what times each word/topic occurs in the stream of text and which speaker of a plurality of speakers spoke the word/topic, and either of receiving a user word search enquiry via the word/topic interface;

searching the string of text for the word search enquiry;

determining the accorded time of the occurrence of each word enquiry in the string of text;

displaying the occurrences of the determined word search enquiry to a user on the temporal interface;

receiving a user instruction indicative of a user selected word;

retrieving the relevant portion of the audio file in which the selected word search enquiry occurs; and playing the retrieved relevant portion to the user; or receiving a user topic search enquiry via the word/topic interface;

searching the string of text for the topic search enquiry;

determining the accorded time of the occurrence of each topic enquiry in the string of text;

displaying the occurrences of the determined topic search enquiry to a user on the temporal interface;

receiving a user instruction indicative of a user selected topic;

retrieving the relevant portion of the audio file in which the selected topic search enquiry occurs; and playing the retrieved relevant portion to the user.

10. A method as claimed in claim 9, wherein the standard audio file is an audio-visual file.

11. A method as claimed in claim 9, further comprising providing an audio speaker, receiving the standard audio file and outputting an audio signal to the assembler.

12. A method as claimed in claim 9, wherein the assembler is a hypertext markup language assembler.

13. A method as claimed in claim 9, whereby each word in the string of text is accorded a time at the beginning of the occurrence of the word and accorded a time at the end of the occurrence of the word and/or whereby each topic in the string of text is accorded a time at the beginning of the occurrence of the topic and accorded a time at the end of the occurrence of the topic.

14. A method as claimed in claim 9, whereby the searchable media object and the audio file are contained in a discrete portable digital file.

15. A method as claimed in claim 9, whereby the searchable media object is run using a web browser which is not connected to the Internet.

16. A computer-readable storage device having instructions stored which, when executed by a computing device, result in the computing device performing operations comprising:

providing an audio file processor;

activating the audio file processor to receive a standard audio file and convert the standard audio file into machine coding;

providing an Automatic Speech Recognition processor;

activating the Automatic Speech Recognition processor to receive the standard audio file, determining each spoken word in the audio file, outputting a string of text comprising each of the determined words;

according each determined word in the string, a time relevant to the time of the occurrence of the word in the string;

providing an assembler;

receiving the machine coding, the string of text and the relevant topics and therefrom, assembling a discrete media object;

providing a search engine;

providing a topic extraction processor;

receiving the string of text from the Automatic Speech Recognition processor;

determining relevant topics in the string of text and recording the time of occurrence of each determined topic within the string of text;

providing a user interface, wherein the user interface comprises a word/topic user interface and a temporal interface, wherein the word/topic interface comprises a list of words/topics and a time of occurrence list which is a list of times at which each word/topic occurs in the string of text, and the temporal interface comprises a schematic representation of the words/topics and at what times each word/topic occurs in the stream of text and which speaker of a plurality of speakers spoke the word/topic, and either of receiving a user word search enquiry via the word/topic interface;

searching the string of text for the word search enquiry;

determining the accorded time of the occurrence of each word enquiry in the string of text;

displaying the occurrences of the determined word search enquiry to a user on the temporal interface;

receiving a user instruction indicative of a user selected word;

retrieving the relevant portion of the audio file in which the selected word search enquiry occurs; and playing the retrieved relevant portion to the user; or receiving a user topic search enquiry via the word/topic interface;

searching the string of text for the topic search enquiry;

determining the accorded time of the occurrence of each topic enquiry in the string of text;

displaying the occurrences of the determined topic search enquiry to a user on the temporal interface;

receiving a user instruction indicative of a user selected topic;

retrieving the relevant portion of the audio file in which the selected topic search enquiry occurs; and playing the retrieved relevant portion to the user.

* * * * *